US011055258B2

(12) United States Patent
Arbetman et al.

(10) Patent No.: US 11,055,258 B2
(45) Date of Patent: Jul. 6, 2021

(54) DIRECTLY ACCESSING ARCHIVED DATA AND EXECUTABLE FILES

(71) Applicant: INTERNATIONAL BUSINESS MACHINES CORPORATION, Armonk, NY (US)

(72) Inventors: Yaron Arbetman, Haifa (IL); Itzhack Goldberg, Hadera (IL); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 14/243,697

(22) Filed: Apr. 2, 2014

(65) Prior Publication Data

US 2015/0286647 A1 Oct. 8, 2015

(51) Int. Cl.
*G06F 16/11* (2019.01)

(52) U.S. Cl.
CPC .................. *G06F 16/113* (2019.01)

(58) Field of Classification Search
CPC ........... G06F 17/30067; G06F 11/1464; G06F 3/0613; G06F 3/649; G06F 16/21; G06F 16/41; G06F 16/1827; G06F 16/113
USPC ....... 707/661, 663, 673, 665, 654, 639, 785; 715/205
See application file for complete search history.

(56) References Cited

U.S. PATENT DOCUMENTS

| 5,764,972 | A  | * | 6/1998  | Crouse .............. G06F 17/30194 |
| 6,240,427 | B1 | * | 5/2001  | Szalwinski ....... G06F 17/30309 |
| 7,054,960 | B1 |   | 5/2006  | Bezbaruah et al. |
| 7,454,592 | B1 | * | 11/2008 | Shah ................... G06F 11/1453 |
|           |    |   |         | 711/216 |
| 7,467,267 | B1 | * | 12/2008 | Mayock .............. G06F 11/1461 |
|           |    |   |         | 707/999.202 |
| 7,873,602 | B2 | * | 1/2011  | Debrunner ........ G06F 17/30575 |
|           |    |   |         | 707/610 |
| 7,908,302 | B1 |   | 3/2011  | Nagaralu et al. |
| 8,386,733 | B1 |   | 2/2013  | Tsaur et al. |
| 8,392,373 | B1 | * | 3/2013  | Hopwood ........... G06F 11/1448 |
|           |    |   |         | 707/661 |
| 8,443,153 | B1 |   | 5/2013  | Edwards et al. |
| 8,495,027 | B2 | * | 7/2013  | Brannon ........... G06F 17/30073 |
|           |    |   |         | 707/673 |

(Continued)

*Primary Examiner* — Mariela Reyes
*Assistant Examiner* — Courtney Harmon
(74) *Attorney, Agent, or Firm* — Griffiths & Seaton PLLC

(57) ABSTRACT

Methods, apparatus and computer program products implement embodiments of the present invention that include selecting an archive storing one or more archived files. Respective locations are identified for each of the one or more archived files, the respective locations are stored to a memory, and using the respective locations in the memory, a corresponding accessible file is defined for each of the one or more archived files. Upon receiving a request to access a given accessible file, a given location in the archive for the given archived file is identified, and the given accessible file can be accessed at the given location. In embodiments where the given accessible file consists of a data file, the given accessible file is accessed by reading data from the data file. In embodiments where the given accessible file consists of an executable file, the given accessible file is accessed by executing the executable file.

9 Claims, 4 Drawing Sheets

(56) References Cited

U.S. PATENT DOCUMENTS

| | | | |
|---|---|---|---|
| 8,918,427 B1* | 12/2014 | Searls | G06F 17/30 707/791 |
| 9,164,700 B2* | 10/2015 | Hutton | G06F 3/0607 |
| 2001/0056425 A1* | 12/2001 | Richard | G06F 11/1461 |
| 2002/0194091 A1* | 12/2002 | Zverev | G06Q 30/02 705/26.1 |
| 2003/0028538 A1* | 2/2003 | Eikenbery | G06F 17/30244 |
| 2003/0154471 A1* | 8/2003 | Teachman | G06F 8/65 717/171 |
| 2005/0050071 A1* | 3/2005 | Debrunner | G06F 17/30575 |
| 2005/0050461 A1* | 3/2005 | Hall | G06F 17/30899 715/205 |
| 2005/0251495 A1* | 11/2005 | Woollen | G06F 17/30067 |
| 2006/0173847 A1* | 8/2006 | Peterson | G06F 17/30153 |
| 2006/0218196 A1* | 9/2006 | Kurita | G06Q 20/341 |
| 2007/0266004 A1* | 11/2007 | Wall | G06F 17/30486 |
| 2009/0089340 A1* | 4/2009 | Ohr | G06F 11/1662 |
| 2009/0240745 A1* | 9/2009 | Stahl | G06F 17/30144 |
| 2009/0313503 A1* | 12/2009 | Atluri | G06F 11/1453 714/19 |
| 2010/0011075 A1* | 1/2010 | Klassen | H04L 51/063 709/206 |
| 2010/0169590 A1* | 7/2010 | Gordon-Carroll | G06F 11/1451 711/162 |
| 2010/0185690 A1* | 7/2010 | Evans | G06F 16/113 707/803 |
| 2010/0228799 A1* | 9/2010 | Hutton | G06F 3/0607 707/822 |
| 2010/0257141 A1* | 10/2010 | Monet | G06F 17/30011 707/665 |
| 2010/0306175 A1* | 12/2010 | Johnson | G06F 17/30085 707/663 |
| 2010/0332454 A1* | 12/2010 | Prahlad | G06F 17/3002 707/654 |
| 2011/0093471 A1* | 4/2011 | Brockway | G06F 21/10 707/747 |
| 2011/0107326 A1 | 5/2011 | Dehaan | |
| 2011/0116636 A1* | 5/2011 | Steed | G06F 21/10 380/281 |
| 2011/0258163 A1* | 10/2011 | Volkoff | G06F 17/30073 707/661 |
| 2012/0158676 A1* | 6/2012 | Bouldin | G06F 17/30153 707/693 |
| 2012/0330903 A1 | 12/2012 | Periyagaram et al. | |
| 2012/0330904 A1 | 12/2012 | Factor et al. | |
| 2013/0073519 A1 | 3/2013 | Lewis et al. | |
| 2013/0091098 A1* | 4/2013 | Hung | G06F 17/30091 707/661 |
| 2013/0191591 A1* | 7/2013 | Kim | G06F 3/0625 711/114 |
| 2014/0081984 A1* | 3/2014 | Sitsky | G06F 9/505 707/741 |
| 2014/0201316 A1* | 7/2014 | Chinn | H04L 67/145 709/217 |
| 2014/0222866 A1* | 8/2014 | Joneja | G06F 17/30073 707/785 |
| 2014/0279908 A1* | 9/2014 | Manfe | G06F 17/30067 707/639 |
| 2014/0282459 A1* | 9/2014 | Hey | G06F 8/65 717/168 |
| 2015/0032827 A1* | 1/2015 | Tyler | H04L 51/16 709/206 |
| 2015/0163326 A1* | 6/2015 | Pan | H04W 4/18 709/217 |

\* cited by examiner

DIRECTLY ACCESSING ARCHIVED DATA AND EXECUTABLE FILES

FIELD OF THE INVENTION

The present invention relates generally to data storage, and specifically to directly accessing files stored in an archive.

BACKGROUND

In computing environments, multiple files can be stored together into a single archive for easier portability and storage, or simply to compress the files to use less storage space. Archives often store directory structures, error detection and correction information, arbitrary comments, and sometimes use built-in encryption. Archives can also store file system data and metadata within the contents of a particular file, and thus can be stored on systems or transmitted over communication channels that do not support the file system stored in the archive.

The description above is presented as a general overview of related art in this field and should not be construed as an admission that any of the information it contains constitutes prior art against the present patent application.

SUMMARY

There is provided, in accordance with an embodiment of the present invention, a method including selecting, by a computer, an archive stored on a storage device, the archive including one or more archived files, identifying, in the archive, respective locations for each of the one or more archived files, storing the respective locations of the one or more archived files to a memory, and defining, using the respective locations in the memory, a corresponding accessible file for each of the one or more archived files.

There is also provided, in accordance with an embodiment of the present invention, a storage system including a storage device, a memory, and a processor configured to select an archive stored on the storage device, the archive including one or more archived files, to identify, in the archive, respective locations for each of the one or more archived files, to store the respective locations of the one or more archived files to a memory, and to define, using the respective locations in the memory, a corresponding accessible file for each of the one or more archived files.

There is further provided, in accordance with an embodiment of the present invention, a computer program product, the computer program product including a non-transitory computer readable storage medium having computer readable program code embodied therewith, the computer readable program code including computer readable program code configured to select an archive stored on a storage device, the archive including one or more archived files, computer readable program code configured to identify, in the archive, respective locations for each of the one or more archived files, computer readable program code configured to store the respective locations of the one or more archived files to a memory, and computer readable program code configured to define, using the respective locations in the memory, a corresponding accessible file for each of the one or more archived files.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Embodiments of the present invention provide methods and systems for retrieving data directly from an archived file stored in an archive. As explained hereinbelow, the archive may comprise multiple archived files stored "end-to-end" in one or more stored files, and the archived files may comprise data and/or executable files. Alternatively, the archive may comprise a single archived file split and stored in multiple stored files.

In embodiments of the present invention an archived file comprises a file stored in an archive that needs to be extracted prior to being accessed, and an accessible file comprises a file stored in an archived that can be directly accessed (i.e., without extraction) using embodiments described herein.

In some embodiments, a computer selects an archive storing, one or more archived files, and identifies, in the archive, respective locations for each of the one or more archived files. The respective locations of the one or more archived files are stored to a memory, and using the respective locations in the memory, a corresponding accessible file is defined for each of the one or more archived files. Upon receiving a request to access a given accessible file, the computer can identify, from the memory, a given location in the archive for the given accessible file, and access the given accessible file at the given location.

By retrieving data directly from a given accessible file in an archive, systems implementing embodiments of the present invention can reduce the time needed to retrieve the data, since the given accessible file does not need to be extracted from the archive prior to retrieving the data. Additionally, since data can be retrieved directly from the given accessible file in the archive, systems implementing embodiments of the present invention typically require less storage space, since the given accessible file does not need to be extracted from the archive prior to data retrieval.

Figure 1:
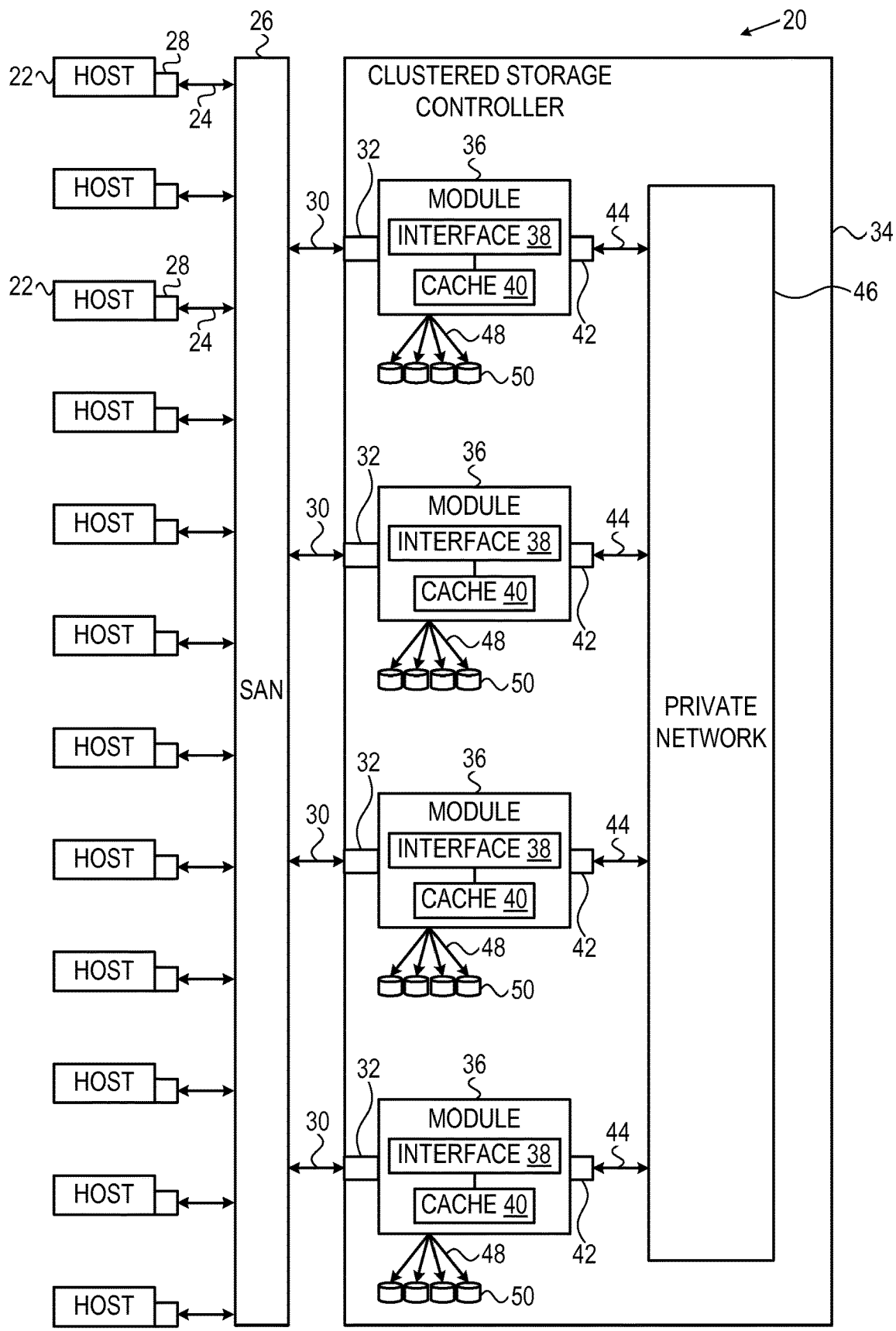
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
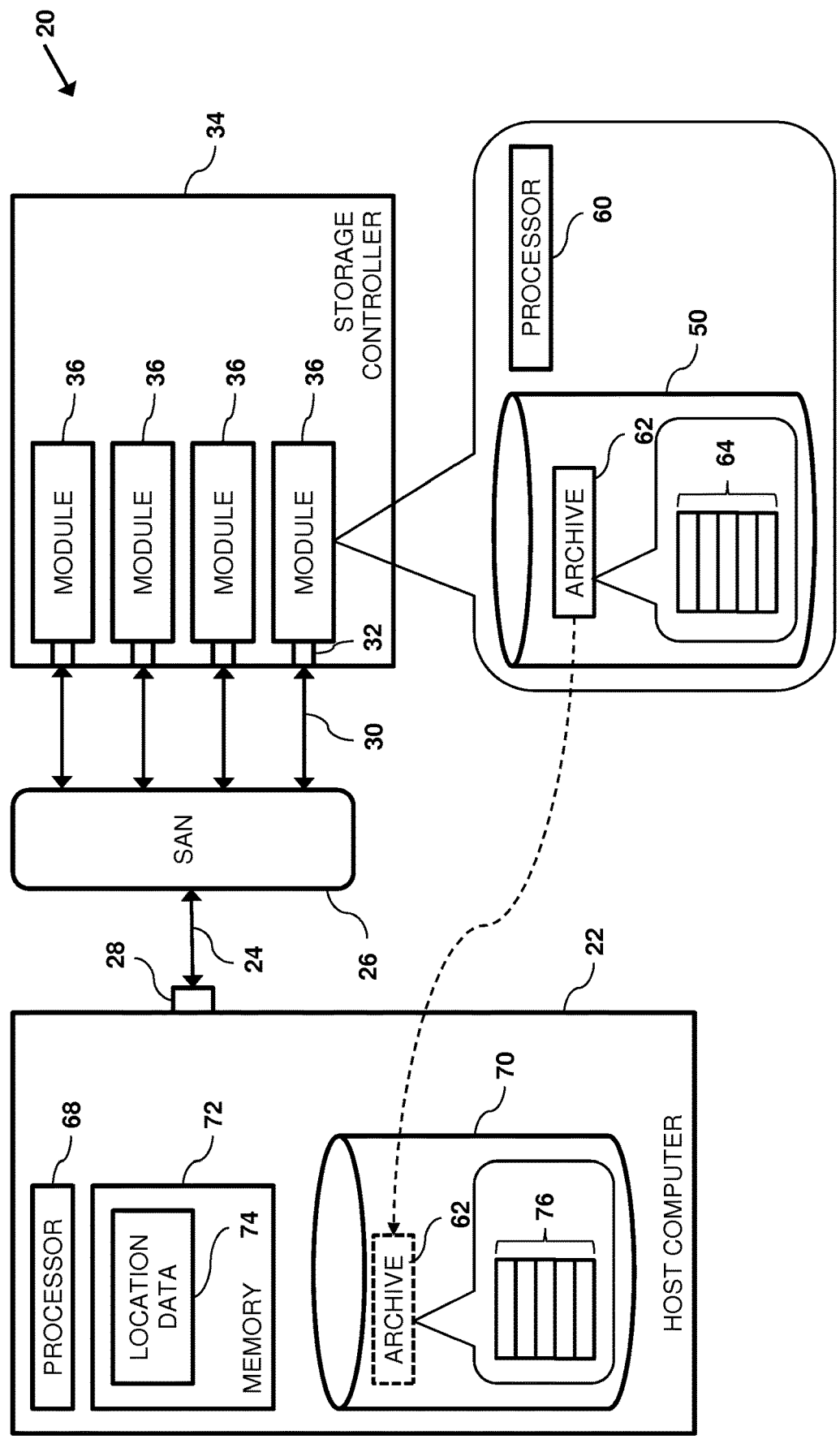
FIG. 2 is a block diagram that schematically illustrates a given host computer in communication with a given module of the storage system and configured to directly access archived files, in accordance with an embodiment of the present invention.

FIG. 2 is a block diagram showing details of host computer 22 and a given module 36, in accordance with an embodiment of the present invention. The given module 36 comprises a processor 60, and a given storage device 50 that stores an archive 62 on storage regions 64 of the given storage device 50. In embodiments herein, the given storage device 50 is also referred to as remote storage device 50 and storage regions 64 are also referred to as remote storage regions 64. The configuration of archive 62 is described in detail hereinbelow. While the configuration shown in FIG. 2 comprises a single archive 62, system 20 may store multiple archives 62.

Host computer 22 comprises a processor 68, a local storage device 70 such as a disk drive or a solid state drive (SSD), and a memory 72 configured to store location data 74. Contents of location data 74 are described hereinbelow. In some embodiments, processor 68 may copy archive 62 from remote storage regions 64 on the remote storage device to local storage regions 76 on the local storage device. In embodiments herein, the remote regions comprise logical or physical blocks of storage space on the remote storage device. Likewise, the local regions comprise logical or physical blocks of storage space on the local storage device. In operation, the logical blocks on storage devices 50 and 70 have respective logical block numbers and the physical blocks on the storage devices may have respective physical block numbers.

While the configuration in FIG. 2 shows host computer 22 configured to access archive 62 on the remote storage device via SAN 26, other configurations of system 20 are considered to be within the spirit and scope of the present invention. For example, system 20 may store archive 62 to a network attached storage (NAS) system (not shown).

Figure 3:
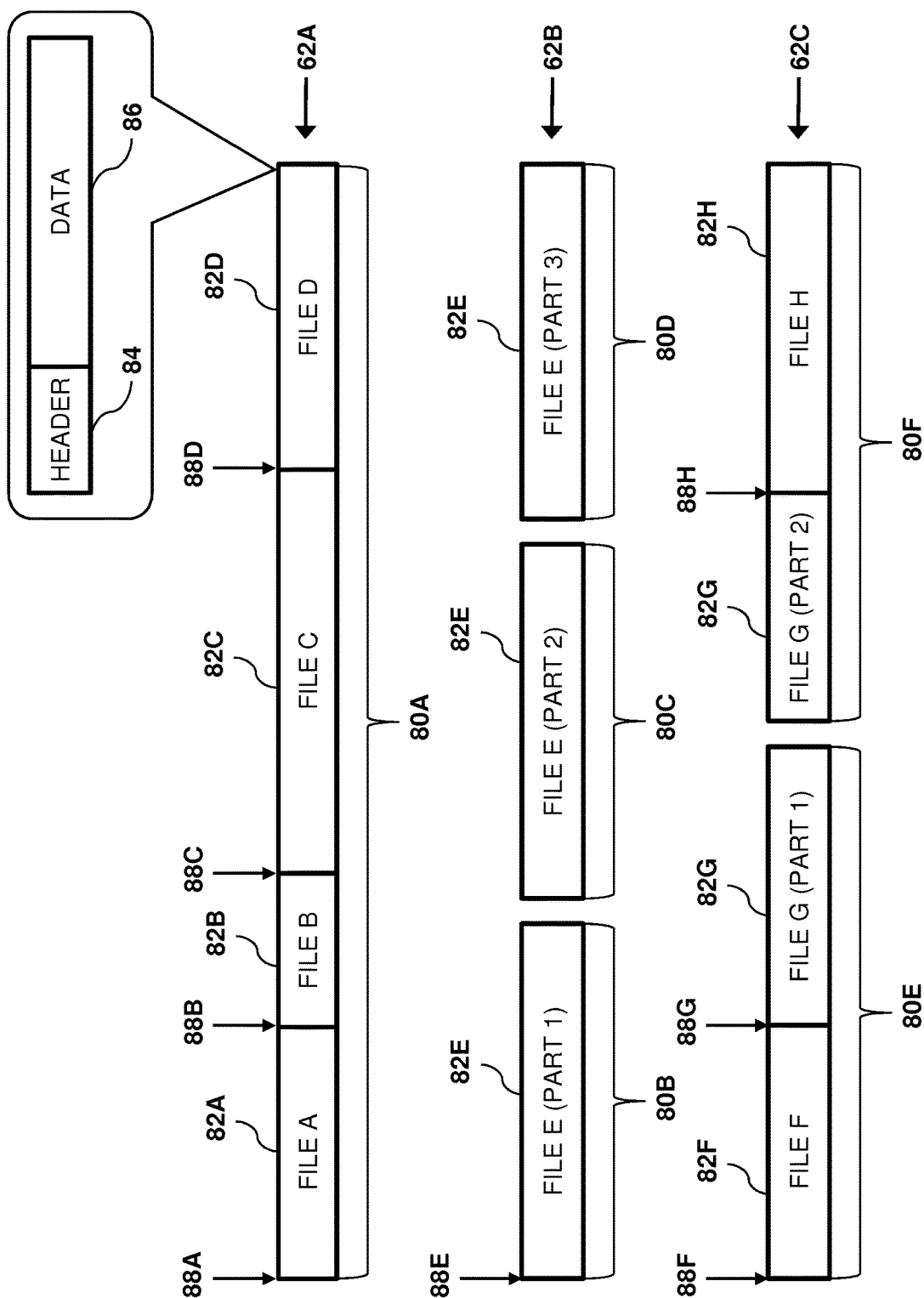
FIGS. 3A-3C are block diagram that schematically illustrate examples of archives storing archived files that can be directly accessed by the host computer, in accordance with embodiments of the present invention.

FIGS. 3A-3C, referred to collectively as FIG. 3, are block diagrams that schematically illustrate various configurations of stored files 80 configured to store archive 62, in accordance with embodiments of the present invention. In the configuration shown in FIG. 3, archives 62 can be differentiated by appending a letter to the identifying numeral, so that the archives comprise archives 62A-62C, and stored files can be differentiated by appending a letter to the identifying numeral, so that the stored files comprise stored files 80A-80F.

In some embodiments, each stored file 80 stores one or more archived files 82. In alternative embodiments, each stored file 80 stores a portion of a given archived file 82 that is split among multiple stored files 80. In the configuration shown in FIG. 3, archived files 82 can be differentiated by appending a letter to the identifying numeral, so that the archived files comprise archived files 82A-82H.

In embodiments where stored files 80 comprise tar files created by a computer system executing a Unix™ or Linux™ operating system, each stored file 80 stored in a given archive 62 comprises a header 84 and data 86. Examples of information stored in header 84 for a given archived file 82 include, but are not limited to, a file name, one or more mode bits, a user identifier, a group identifier, a timestamp, a size of data 86, and a null header that indicates the end of archive 62.

In embodiments described herein, each archived file 82 is stored at a respective location 88 in system 20. In the configuration shown in FIG. 3, locations 88 can be differentiated by appending a letter to the identifying numeral, so that the locations comprise locations 88-88. A given location 88 for a given archived file 82 comprises information such as a name of a given stored file 80, a starting physical block number, a starting logical block number and a file displacement indicating a starting offset and/or an ending offset for the given archived file in the given stored file.

In embodiments of the present invention, location data 74 comprises the information described hereinabove that indicates location(s) 88, and the combination of location data 74 and archive 62 can be viewed as a file system that can "mounted" in system 20. As explained hereinbelow, processor 68 can use the location data to "create" (i.e., define) accessible files that can be accessed directly from stored files 80.

In the example shown in FIG. 3A, archive 62A comprises a single stored file 80A that stores archived file 82A at location 88A, archived file 82B at location 88B, archived file 82C at location 88C and archived file 82D at location 88D.

In the example shown in FIG. 3B, archive 62B comprises a single archived file 82E split into multiple stored files 80B, 80C and 80D. While the configuration in FIG. 3B shows archived file 82E split into multiple stored files 80B, 80C and 80D, stored files 80B-80D may comprise any type of file (i.e., not a stored file). Additionally, since only archived file 82E is stored in stored files 80B-80D at location 88E, stored files 80B-80D may only store respective data 86 for archived file 82E and may not store a respective header 84 for v file 82E.

In the example shown in FIG. 3C, archive 62C comprises stored files 80E and 80F storing archived file 82F at location 88F in stored file 80E, archived file 82H stored at location 88H in stored file 80F. Archive 62C also comprises archived file 82G that starts storing data at location 88G in stored file 80E, and whose data is split and stored in both stored files 80E and 80F.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Archive File Decomposition

Figure 4:
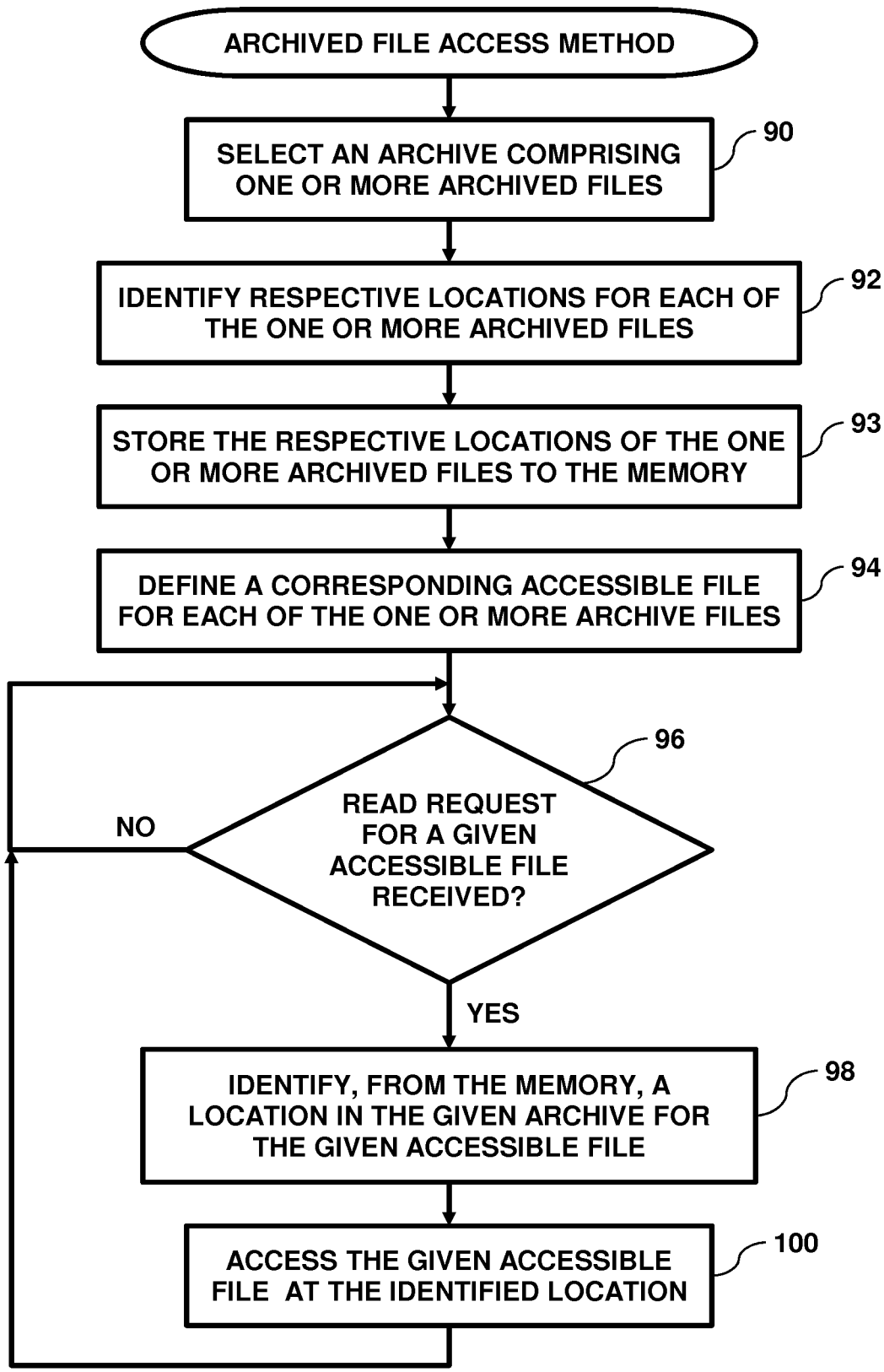
FIG. 4 is a flow diagram that schematically illustrates a method of accessing a given archived file stored in a given archive, in accordance an embodiment of the present invention.

FIG. 4 is a flow diagram that schematically illustrates a method of accessing a given archived file 82 stored in a given archive 62, in accordance an embodiment of the present invention. Archive 62 comprises one or more archived files 82, wherein each of the archived files comprises a data file or an executable file.

In a selection step 90, processor 68 selects a given archive 62 comprising one or more archived files 82. In some embodiments, the given archive comprises one or more stored files 80 that store one or more archived files 82. In alternative embodiments, the given archive may comprise a single archived file 82 split into multiple stored files 80. The one or more stored files may be stored on a remote storage device 50, and in some embodiments, processor 68 may copy the one or more stored files from remote storage device 50 to local storage device 70.

In a first identification step 92, processor 68 identifies respective locations 88 for each archived file 82 in the given archive, and in a store step 93, processor 68 stores, to location data 74 in memory 72, the respective locations of the one or more archived files 82. In a definition step 94, processor 68 defines, using the respective locations in location data 74, a corresponding accessible file for each archived file 82 in the given archive.

In a comparison step 96, processor 68 waits to receive a read request comprising a request to retrieve data from a given accessible file, and upon receiving the request, the processor identifies, from location data 74, a given location 88 in the given archive for the given accessible file in an identification step 98.

As described supra, the given location may comprise, in the given archive, a logical block number and/or a physical block number and/or a file displacement. In some embodiments, the given location indicates remote storage regions 64 storing the given accessible file on remote storage device 50. In embodiments where processor 68 copies archive 62 from remote storage device 50 to local storage device 70, the given location indicates a given local storage region 76 storing the given accessible file on the local storage device.

Finally, in a retrieval step 100, processor 68 accesses the accessible file at the identified given location in the given archive, and the method continues with step 94. In embodiments where the given accessible file comprises a data file, processor 68 accesses the given accessible file at the identified given location by retrieving data from the given accessible, and storing the retrieved data to memory 72. In embodiments where the given accessible file comprises an executable file, processor 68 accesses the given accessible file at the identified given location by executing the executable file stored at the given location in the given archive. To execute the executable file, processor 68 loads, to memory 72, the executable file stored at the given location, and initiates execution of the executable file from the memory.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    selecting, by a computer, an archive storing tar files on a storage device within a data storage system comprising a storage server remotely located from yet in communication with the computer via a storage area network (SAN), the archive comprising a single file comprising one of the tar files having one or more archived files compressed and stored within the single file of the archive, and each of the archived files comprising executable files of compiled program instructions requiring decompression and extraction from the single file of the archive using an archive extraction application prior to accessing, wherein each of the tar files include a header storing a file name, one or more mode bits, a user identifier, a group identifier, a timestamp, a size of data of the one or more archived files, and a null header indicating an end of the archive;
    identifying, in the archive, respective locations for each of the one or more archived files in the data storage system such that the respective locations identify a storage location including a file offset within the single file of the archive at which the one or more archived files reside;
    storing the respective locations of the one or more archived files residing within the single file of the archive to a memory within the computer, wherein storing the respective locations of the one or more archived files to the memory is performed without moving any content of the archive between the archive on the storage device and the memory of the computer and includes viewing a combination of location data indicative of the respective locations and the archive as a file system mounted on the computer;
    creating, using the respective locations in the memory and prior to a request to access any of the one or more archived files, a corresponding accessible file for each of the one or more archived files such that both the one or more archived files and each corresponding accessible file is stored within the single file of the archive, each accessible file using a pointer to the memory in the computer to locate the one or more archived files corresponding thereto in the archive of the data storage system; wherein the corresponding accessible file is stored within the single file of the archive in the data storage system notwithstanding the corresponding accessible file is stored uncompressed and does not require extraction via the archive application prior to accessing;
    responsive to receiving the request to access a respective one of the one or more archived files, querying the memory to determine the location of the corresponding accessible file to the respective one of the one or more archived files; and
    responsive to determining the location in the memory, accessing the corresponding accessible file at the respective location comprising a respective physical block number and a respective logical block number within the single file of the archive of the data storage system, and delivering contents of the corresponding accessible file to the archived file to the computer, wherein upon accessing the contents, the executable file of the corresponding accessible file is loaded from the single file of the archive in the data storage system to the memory of the computer and an execution of the executable file is initiated from the memory.

2. The method according to claim 1, wherein the computer comprises a host computer having a local storage device having local storage regions, the host computer in communication with a remote storage device having remote storage regions.

3. The method according to claim 2, and comprising prior to defining the corresponding accessible file for each of the one or more archived files, copying the archive from the remote storage device to the local storage device, and wherein the given location comprises a given local storage region storing the given data file.

4. The method according to claim 2, wherein the given location comprises a remote storage region storing the given data file.

5. An apparatus, comprising:
    a storage device within a data storage system;
    a memory; and
    a processor configured:
        to select an archive storing tar files on a storage device within a data storage system comprising a storage server remotely located from yet in communication with the computer via a storage area network (SAN), the archive comprising a single file comprising one of the tar files having one or more archived files compressed and stored within the single file of the archive, and each of the archived files comprising executable files of compiled program instructions requiring decompression and extraction from the single file of the archive using an archive extraction application prior to accessing, wherein each of the tar files include a header storing a file name, one or more mode bits, a user identifier, a group identifier, a timestamp, a size of data of the one or more archived files, and a null header indicating an end of the archive;
        to identify, in the archive, respective locations for each of the one or more archived files in the data storage system such that the respective locations identify a storage location including a file offset within the single file of the archive at which the one or more archived files reside;
        to store the respective locations of the one or more archived files residing within the single file of the archive to a memory within the computer, wherein storing the respective locations of the one or more archived files to the memory is performed without moving any content of the archive between the archive on the storage device and the memory of the computer and includes viewing a combination of location data indicative of the respective locations and the archive as a file system mounted on the computer;

to create, using the respective locations in the memory and prior to a request to access any of the one or more archived files, a corresponding accessible file for each of the one or more archived files such that both the one or more archived files and each corresponding accessible file is stored within the single file of the archive, each accessible file using a pointer to the memory in the computer to locate the one or more archived files corresponding thereto in the archive of the data storage system; wherein the corresponding accessible file is stored within the single file of the archive in the data storage system notwithstanding the corresponding accessible file is stored uncompressed and does not require extraction via the archive application prior to accessing;

responsive to receiving the request to access a respective one of the one or more archived files, to query the memory to determine the location of the corresponding accessible file to the respective one of the one or more archived files; and responsive to determining the location in the memory, to access the corresponding accessible file at the respective location comprising a respective physical block number and a respective logical block number within the single file of the archive of the data storage system, and to deliver contents of the corresponding accessible file to the archived file to the computer, wherein upon accessing the contents, the executable file of the corresponding accessible file is loaded from the single file of the archive in the data storage system to the memory of the computer and an execution of the executable file is initiated from the memory.

6. The apparatus according to claim 5, wherein the storage device comprises a local storage device having local storage regions, and wherein the processor is in communication with a remote storage device having remote storage regions.

7. The apparatus according to claim 6, wherein prior to defining the corresponding accessible file for each of the one or more archived files, the processor is configured to copy the archive from the remote storage device to the local storage device, and wherein the given location comprises a given local storage region storing the given data file.

8. The apparatus according to claim 6, wherein the given location comprises a remote storage region storing the given data file.

9. A computer program product, the computer program product comprising:

a non-transitory computer readable storage medium having computer readable program code embodied therewith, the computer readable program code comprising:

computer readable program code configured to select an archive storing tar files on a storage device within a data storage system comprising a storage server remotely located from yet in communication with the computer via a storage area network (SAN), the archive comprising a single file comprising one of the tar files having one or more archived files compressed and stored within the single file of the archive, and each of the archived files comprising executable files of compiled program instructions requiring decompression and extraction from the single file of the archive using an archive extraction application prior to accessing, wherein each of the tar files include a header storing a file name, one or more mode bits, a user identifier, a group identifier, a timestamp, a size of data of the one or more archived files, and a null header indicating an end of the archive;

computer readable program code configured to identify, in the archive, respective locations for each of the one or more archived files in the data storage system such that the respective locations identify a storage location including a file offset within the single file of the archive at which the one or more archived files reside;

computer readable program code configured to store the respective locations of the one or more archived files residing within the single file of the archive to a memory within the computer, wherein storing the respective locations of the one or more archived files to the memory is performed without moving any content of the archive between the archive on the storage device and the memory of the computer and includes viewing a combination of location data indicative of the respective locations and the archive as a file system mounted on the computer;

computer readable program code configured to create, using the respective locations in the memory and prior to a request to access any of the one or more archived files, a corresponding accessible file for each of the one or more archived files such that both the one or more archived files and each corresponding accessible file is stored within the single file of the archive, each accessible file using a pointer to the memory in the computer to locate the one or more archived files corresponding thereto in the archive of the data storage system; wherein the corresponding accessible file is stored within the single file of the archive in the data storage system notwithstanding the corresponding accessible file is stored uncompressed and does not require extraction via the archive application prior to accessing;

computer readable program code configured, responsive to receiving the request to access a respective one of the one or more archived files, to query the memory to determine the location of the corresponding accessible file to the respective one of the one or more archived files; and computer readable program code configured, responsive to determining the location in the memory, to access the corresponding accessible file at the respective location comprising a respective physical block number and a respective logical block number within the single file of the archive of the data storage system, and to deliver contents of the corresponding accessible file to the archived file to the computer, wherein upon accessing the contents, the executable file of the corresponding accessible file is loaded from the single file of the archive in the data storage system to the memory of the computer and an execution of the executable file is initiated from the memory.

* * * * *